United States Patent

Bouiller et al.

[11] 4,334,827
[45] Jun. 15, 1982

[54] DEVICE FOR ATTACHING BLADES TO A COMPRESSOR ROTOR FOR A TURBOJET

[75] Inventors: Jean G. Bouiller, Brunoy; Raymond J. M. Joubert, Savigny sur Orge, both of France

[73] Assignee: Societe Nationale d'Etude et de Construction de Moteurs d'Aviation "SNECMA", Paris, France

[21] Appl. No.: 137,010

[22] Filed: Apr. 3, 1980

[30] Foreign Application Priority Data

Apr. 4, 1979 [FR] France .................. 79 08487

[51] Int. Cl.³ ............................................. F01D 5/30
[52] U.S. Cl. .................. 416/220 R; 416/218
[58] Field of Search ............... 416/193 A, 218, 219 R, 416/220 R, 220 A

[56] References Cited

U.S. PATENT DOCUMENTS

| 1,680,785 | 8/1928 | Herr | 416/220 R X |
| 2,430,185 | 11/1947 | Prescott | 416/220 R |
| 3,627,448 | 12/1971 | Rupp | 416/220 R |
| 4,111,603 | 9/1978 | Stahl | 416/219 R X |

FOREIGN PATENT DOCUMENTS 2344710 10/1977 France .................. 416/220 R

Primary Examiner—Leonard E. Smith
Attorney, Agent, or Firm—Oblon, Fisher, Spivak, McClelland & Maier

[57] ABSTRACT

An apparatus for attaching blades to a compressor rotor for a turbojet including a rotor drum in which holes are provided which extend radially and into which the blades are inserted. The blades include successive platform portions by means of which such draw support from the wall portion of the holes, such blades being locked radially to the drum by means of a cotter pin engaged between foot portions of two adjacent blades and pressing against the interior surface of the drum.

8 Claims, 8 Drawing Figures

DEVICE FOR ATTACHING BLADES TO A COMPRESSOR ROTOR FOR A TURBOJET

BACKGROUND OF THE INVENTION

1. Field of the Invention

The subject of this invention is a device for attaching blades to a compressor rotor for a turbojet.

2. Description of the Prior Art

There are known methods of manufacturing compressor rotors which entail reinforcing rings filled with wound fibers sunk into a stamped area. However, in such rotors the attachment of the blades may pose certain mounting problems and problems with regard to resistance to the centrifugal forces exercised by the blades and transmitted to the rim.

The purpose of the invention is to meet such demands and to make it possible to mount blades which are inserted from the outside into holes made in the rotor, with the foot of the blade protruding into the interior of the internal diameter of the rotor.

SUMMARY OF THE INVENTION

In accordance with the invention, the blades feature successive platforms by means of which they press against the side walls of the holes such blades being radially locked in place on a drum by means of a cotter pin engaged between the feet of two adjacent blades and pressing against the inside surface represented by the internal diameter of the drum.

In one method of manufacture of the present invention, the central part of the rim of the rotor is made up of several layers of fiber. Cotter pins serve as a keystone and are inserted between the feet of the blades to ensure that they are radially locked in the centripetal and centrifugal sense. In addition, the centrifugal forces exercised by the blades are transmitted to the rim by the cotter pins.

In another method of manufacture of the present invention, the central part of the rim of the rotor is metallic. This arrangement provides for a more desirable pressure force of the blade platforms being applied against the metallic surfaces participating in the acceleration of the forces affecting the blades.

BRIEF DESCRIPTION OF THE DRAWINGS

Various other objects, features and attendant advantages of the present invention will be more fully appreciated as the same becomes better understood by reference to the following detailed description when considered in connection with the accompanying drawings wherein like reference characters designate like or corresponding parts throughout the several views, and wherein.

DETAILED DESCRIPTION OF THE PREFERRED EMBDIMENTS

Figure 1:
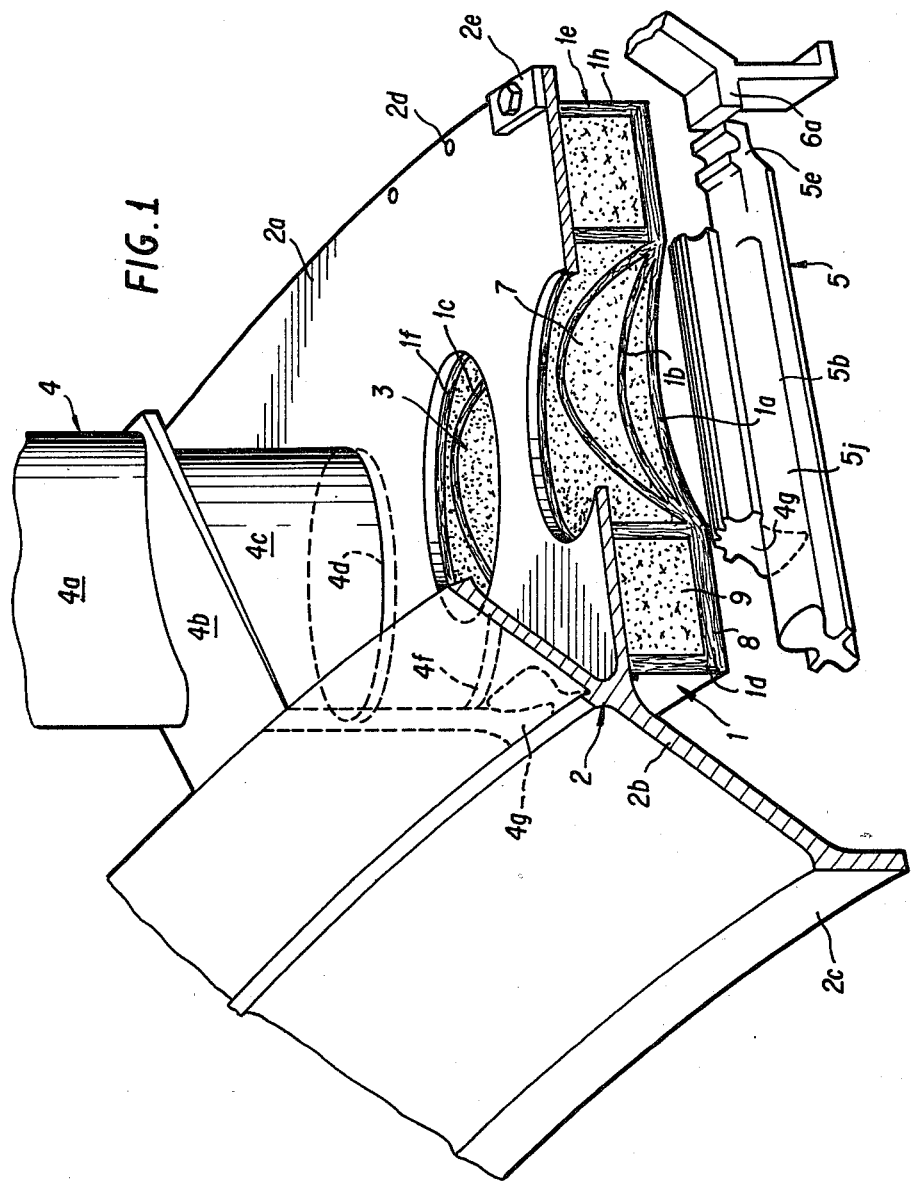
FIG. 1 is a synoptic view of one method of manufacture of the device for attaching blades to a rotor in accordance with the present invention.
Figure 2:
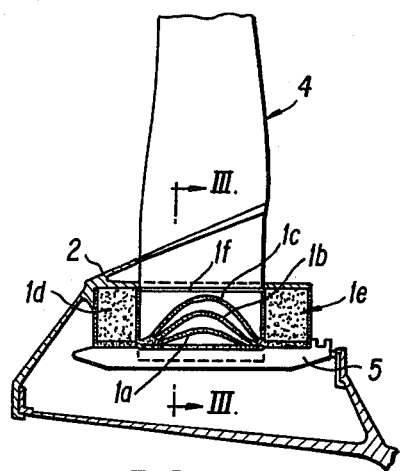
FIG. 2 is an axial cross sectional view of the attachment device represented in FIG. 1.
Figure 3:
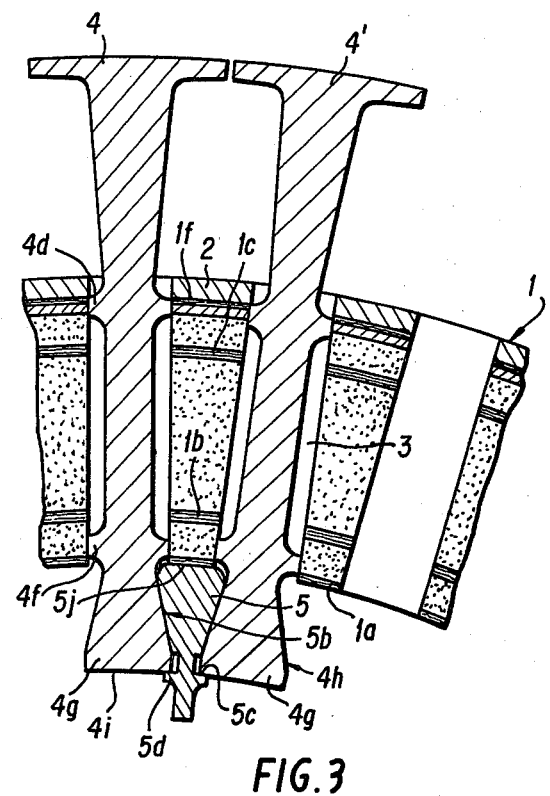
FIG. 3 is a transversal cross sectional view along line III—III of FIG. 2.

FIGS. 1, 2 and 3 represent one method of manufacturing the device according to the present invention for attaching blades to a compressor rotor for a turbojet. In this particular manufacturing approach, the rotor includes a rim 1 of a composite material made up of several skins or layers of fibers 1a, 1b, 1c, if arranged according to the procedure which is the subject of French Pat. No. 73.24890 (published application No. 2 347 858) and between which there is a composite bonding material 7, this such that the layers are subjected to traction by the centrifugal forces acting on the blades. The outside layer of skin 1f, which constitutes a core, connects two rings 1d and 1e which have a U-shaped cross-section, each being made up of a matrix 8 of a synthetic or metallic material in which layers of wound fibers 9 are arranged.

Attached to the layer of fibers 1f constituting the external surface of the rim, by means of gluing, is the cylindrical part 2a of a titanium collar 2, which consists of a conical portion 2b with a perforated flange 2c by which means it is interlocked with the drum of the rotor.

After the operation of gluing together the composite rim 1 and the collar 2, small holes 3 are machined, holes designed to receive the feet of the blades 4. On the back side of the rim 2 are formed holes 2d, spaced in a circular pattern, intended for the attachment of balancing plates 23.

In the small holes 3 are placed the feet of the blades 4, which consist of a blade 4a, a first platform 4b which reconstitutes the internal vein, a stilt 4c, a second platform 4d, and a third platform 4f, the sections of which correspond to that of the hole 3 and which ensure an angular setting identical to that of all the blades.

The foot of each blade 4 has one end 4g in the shape of a dovetail so as to delimit, by the inclined surfaces 4h of two feet of adjacent blades 4, 4' (FIG. 3), a space in which a cotter pin 5 is engaged, the latter having a cross section in the shape of a dovetail the surfaces 5b of which are in contact with the surfaces 4h of the foot of the blade. The platform 5j provided on the upper part of the cotter pin 5 presses against the internal diameter of the rim 1 and distributes the burden resulting from the centrifugal forces acting on the blades over it entire surface.

The dovetail-shaped portion of the cotter pin 5 is extended by a portion with a cruciform cross section whose surface 5c on the arms 5d abuts the surface 4i of the feet of the blades 4g (FIG. 3), thus preventing radial sliding of the blades to the inside (an action analogous to that of a keystone) and to the outside. The cotter pin 5 is longitudinally maintained in place on one side by a flange 5e abutting the surface 1h of the rim and on the other side by a boss 6a formed on the flange (FIG. 1).

The blades are mounted on the rotor as described below. Two consecutive blades 4 are introduced into their respective holes 3 and the cotter pin 5 is engaged from the back so that the flange 5e abuts the back surface 1h of the ring 1e. The cotter pins 5 radially lock all the blades onto the rim. In the course of rotation of the rotor, the platforms or upper surfaces 5j of the cotter pins transmit a centrifugal force by pressure to the internal diameter of the rotor and diffuse such force to rings 1d and 1e.

Figure 4:
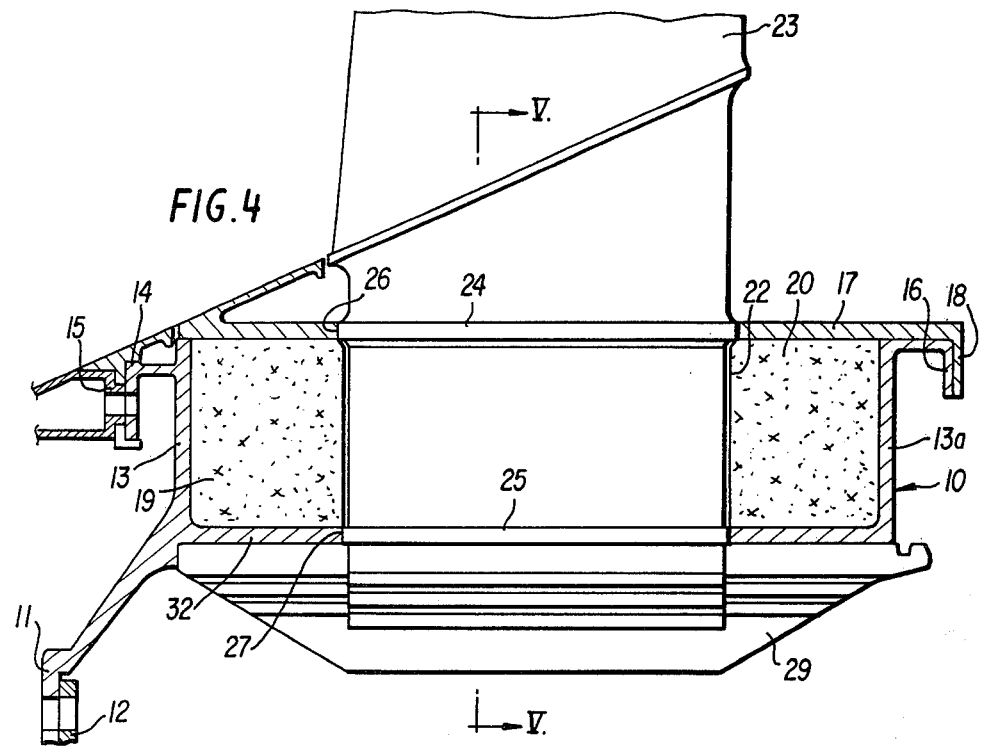
FIG. 4 is an axial cross sectional view of an alternate method of manufacturing the device for attaching blades to a rotor in accordance with the present invention.
Figure 5:
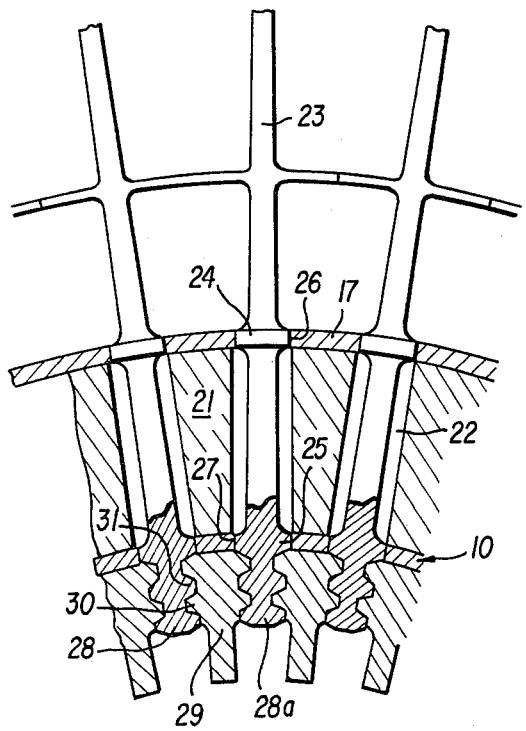
FIG. 5 is a transversal cross sectional view along line V—V of FIG. 4.

FIGS. 4 and 5 represent one variant of manufacture of the device for attachment, a variant in which the rim of the rotor consists of a metallic U-shaped collar 10 attached by a flange 11 onto a forward trunion of the compressor 12. The forward vertical wall 13 of the collar 10 has a forward flange 14 (FIG. 4) on which is attached a forward casing 15, and the rear vertical wall 13a of the collar 10 has a rear flange 16 on which is attached a cover 17 attached by a flange 18.

On the inside of the collar 10, before the closure of the cover 17, are positioned two rings 19 and 20 made of a composite material, namely boron and aluminum, separated by a fiberglass and resin winding 21. Holes 22 are machined simultaneously in the horizontal branch of the collar 10, in the winding 21 (FIG. 5) and in the cylindrical cover 17 in such a way that the openings made in the three elements line up well with each other.

As in the previous example, the feet of the blades 23 (FIG. 5) are inserted into the holes 22 in such a way that platforms 24 and 25 press laterally against the radial walls of the openings 26 and 27 provided in the cover 17 and the horizontal part of the collar 10. This arrangement makes it possible for better acceleration through metal on metal contact, with torque being exercised on the blades. Between the feet 28, 28a of the two adjacent blades 23 is inserted a cotter pin 29 with a so-called "pine tree" shape, which has lateral teeth 30 which fit into spaces provided between corresponding teeth 31 arranged on the lateral surfaces of the blade feet 28. The external part of the cotter pins 29 are pressed against the surfaces 32 of the collar 10 over their entire length so as to ensure better resistance to the hammering effects resulting from the metal on metal contact.

Figure 6:
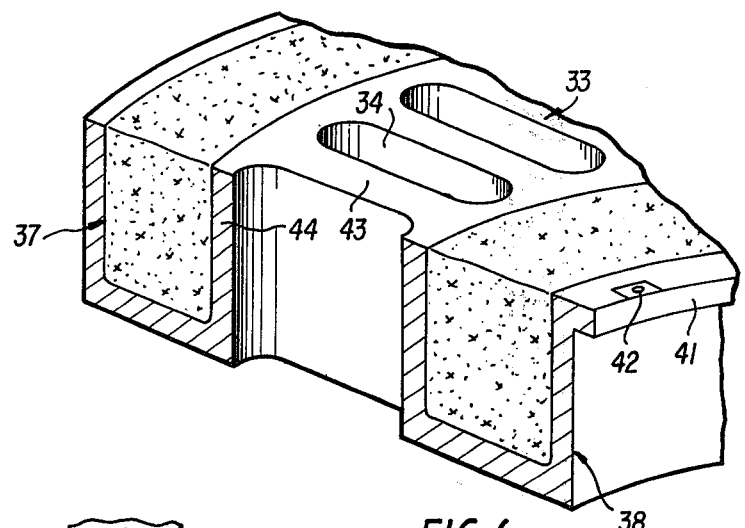
FIG. 6 is a perspective of another method of manufacturing the device in which the central metallic portion of the rim is solid.
Figure 7:
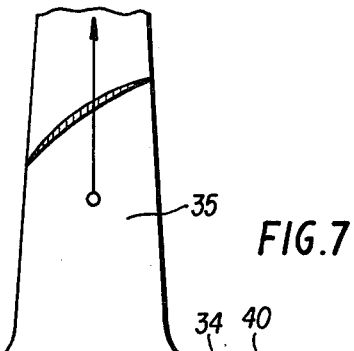
FIG. 7 is a transversal cross sectional view of the mounting of the blades to the rim represented in FIG. 6.

FIGS. 6 and 7 represent a variant method of manufacturing the rim in which the blades are attached wherein the rim is metallic instead of being made of a composite material. The rim consists of a solid central part 33 in which the holes 34 designed to receive the feet of the blades 35 are machined. The blade feet are locked in by means of cotter pins 36 which are identical to those represented in FIGS. 4 and 5. On both sides of the central portion 33 there are two U-shaped grooves 37 and 38 in which windings 39 and 40, of a composite material, are inserted. On the back side of the rim there is positioned a flange 41 which makes it possible to attach balancing plates 42.

This particular method of manufacture features small spokes 43 which play a role in the better distribution of the centrifugal forces. In addition, the inside surfaces of the two lateral grooves 37 and 38 absorb the scissoring stresses engendered by the blades (provided with feet 28 and cotter pins 29 in accordance with FIGS. 4 and 5, Plate IV.4).

Figure 8:
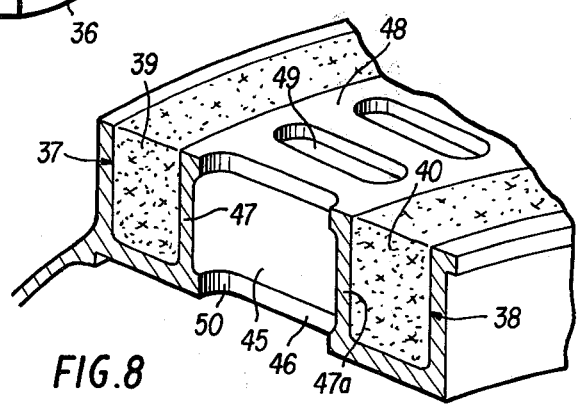
FIG. 8 is a perspective of yet another method of manufacturing the devce in accordance with the present invention in which the central metallic portion of the rim is hollow.

FIG. 8 represents another method of manufacture of a metallic rim for a rotor for the attachment of blades. In this case the central portion 45 is hollowed out in order to save weight and is in the form of a U-shaped groove with a base 46 and two lateral walls 47, 47a which are the internal sides of the two lateral grooves 37, 38 in which the windings 39, 40 are inserted as in the foregoing example. On the outside diameter of the central part 45 is attached, by means of welding, a cylindrical ring 48 in which are machined holes 49 which correspond to holes 50 machined in the base 46 and which are intended to receive the feet of the blades.

The methods of manufacture represented in FIGS. 6 and 8 have the advantage over those which have a central portion made of a composite material in that they provide better support for the platforms 4d and 4f of the blades against metallic surfaces which take part in taking up the stresses affecting the blades.

Of course, various modifications may be made by persons skilled in the field to the devices and procedures which have just been described above, such descriptions being provided uniquely by way of nonrestrictive examples, without departing from the context of the invention.

What is claimed as new and desired to be secured by Letters Patent of the United States is:

1. An apparatus for attaching blades to a compressor rotor for a turbojet comprising:

a rotor drum in which are formed holes having walls extending radially and within which said blades are inserted, said blades forming successive platforms by means of which said blades receive support from said walls of said holes; and a cotter pin inserted between foot portions of two adjacent blades wherein said blades are locked in place radially on said drum by means of said cotter pin and draw support from an interior surface portion of said drum.

2. The apparatus according to claim 1, further comprising a plurality of binding rings which comprise layers of wound fibers connected by a matrix of synthetic or metallic material;

a metallic collar having a cylindrical part and a conical portion including a flange interconnecting said metallic collar to said drum;

said drum further comprising a rim of composite material including outer and inner skins or layers of fiber and a composite material positioned therebetween, said outer skin having wavy patterns delimiting grooves within which said binding rings are disposed;

said rim being connected to external surface portion of said cylindrical part of said metallic collar, said rim and said collar having holes formed therein defining receptacles for said foot portions of said blades.

3. An apparatus according to claims 1 or 2, said foot portions of said blades including inclined surfaces and said cotter pin being positioned between foot portions of two adjacent blades and including a cross sectional dovetail shape, lateral surfaces of which press against corresponding inclined surfaces of said foot portions of said two adjacent blades;

said cotter pin including platform portions pressing against an internal diameter of said rim, the portion of said cotter pin of a dovetail shape including an extended section of a cruciform cross sectional shape, arms of which abut the surface of end portions of said foot portions of said two adjacent blades.

4. An apparatus according to claim 3, said cotter pin including a flange abutting an outside surface of said rim and further comprising a second flange against which said cotter pin is pressed.

5. An apparatus according to claim 1, further comprising:
   a cylindrical cover;
   said drum including a rim comprising a U-shaped metallic collar including a flange connecting said collar to a forward casing portion of said compressor rotor and vertical walls which include, respectively, a frontal flange to which the forward casing portion is attached and a rear flange to which said cylindrical cover is attached; and
   first and second rings of composite material separated by a winding of fiber and resin and enclosed within said collar, said collar and said winding having formed therein holes into which said foot portions of said blades are inserted, said collar including platform portions laterally supported against radial wall portions of said holes in said cover and in said collar.

6. An apparatus according to claim 5, said foot portions of said blades including teeth members;
   said cotter pin being positioned between foot portions of two adjacent blades and including teeth members formed on two lateral surfaces thereof engaging corresponding teeth of said foot portions of said blades wherein an upper surface of said cotter pin pressingly engages an internal diameter portion of said rim.

7. An apparatus according to claim 6, further comprising:
   windings of composite material;
   said rim comprising metallic material and including a solid metallic central portion with holes formed therein within which said foot portions of said blades are disposed and including spokes arranged between said holes and wherein said rim forms two lateral U-shaped grooves each containing said windings of composite material.

8. An apparatus according to claim 6, further comprising:
   windings of composite material;
   said rim comprising metallic material and including first and second lateral U-shaped grooves formed therein and a hollowed out central portion delimited by first and second circular walls connected to wall portions of said first and second lateral U-shaped grooves, each of which contains said windings of said composite material wherein said circular walls of said central portion includes holes formed therein within which said foot portions of said blades are disposed.

* * * * *